United States Patent [19]
Ko et al.

[11] Patent Number: 5,623,499
[45] Date of Patent: Apr. 22, 1997

[54] METHOD AND APPARATUS FOR GENERATING CONFORMANCE TEST DATA SEQUENCES

[75] Inventors: Ya-Tien Ko, Manalapan; Sanjoy Paul, Atlantic Highlands, both of N.J.

[73] Assignee: Lucent Technologies Inc., Murray Hill, N.J.

[21] Appl. No.: 267,109

[22] Filed: Jun. 27, 1994

[51] Int. Cl.$^6$ .................................................. G11C 29/00
[52] U.S. Cl. ........................................... 371/22.1; 364/578
[58] Field of Search .......................... 371/22.1, 27, 22.2; 364/578, 148, 140, 550; 395/200, 375, 500, 922

[56] References Cited

U.S. PATENT DOCUMENTS

| | | | |
|---|---|---|---|
| 4,692,921 | 9/1987 | Dahbura et al. | 371/27 |
| 4,696,006 | 9/1987 | Kawai | 371/27 |
| 4,991,176 | 2/1991 | Dahbura et al. | 371/27 |
| 5,003,470 | 3/1991 | Carpenter et al. | 395/200 |
| 5,163,016 | 11/1992 | Har'El et al. | 364/578 |
| 5,230,061 | 7/1993 | Welch | 364/148 |
| 5,299,206 | 3/1994 | Beaverson et al. | 371/22.1 |

OTHER PUBLICATIONS

Bahar et al. "An ADD–Based Algorithm for Shortest Path Back–Tracing of Large Graphs," Proceedings Design Automation of High Performance VLSI System GLSV '94 pp. 248–251.

Aho, A.V. et al., "An Optimization Technique for Protocol Conformance Test Generation Based on UIO Sequences and Rural Chinese Postman Tours", Symposium of Protocol Specification, Testing and Verification, 1988.

Chan, W.Y., Vuong, S.T., Ito, M.R., "An Improved Protocol Test Generation Procedure Based on UIOS," 1989, pp. 283–289.

Chanson, S.T., Zhu, J., "A Unified Approach to Protocol Test Sequence Generation," Proceedings of IEEE INFOCOM '93, Mar. 1993, pp. 106–114.

Chun, W., Amer, P.D., "The Case Generation for Protocols Specified in Estelle," Oct. 1990.

DeMillo, R.A., et al, "Constraint–Based Automatic Test Data Generation," IEEE Transactions on Software Engeneering, vol. 17, No. 9, Sep. 1991, pp. 900–910.

DeMillo, R.A. et al., "Hints on Test Data Selection: Help for the Practicing Programmer," IEEE, 1978, pp. 34–41.

Frankl, P.G., Weyuker, E.J., "Provable Improvements on Branch Testing," IEEE Transactions on Software Engineering, Oct. 1993, 29 pages.

McHugh, J.A., *Algorithmic Graph Theory*, Prentice Hall, 1990, pp. 42–44, 190–197.

(List continued on next page.)

*Primary Examiner*—Emanuel T. Voeltz
*Assistant Examiner*—Edward Pipala
*Attorney, Agent, or Firm*—Robert E. Rudnick

[57] ABSTRACT

A method and apparatus for generating a conformance test data sequence of minimal length to verify that a device conforms to a protocol entity which can be characterized by a simplified extended finite state machine. The method generates an expanded directed graph of the protocol wherein each state is represented by a state vertex and a dummy vertex which are connected to other similar state and dummy vertices by directed edges in a configuration corresponding to the operation of the machine. The directed edges are then assigned traversal numbers corresponding to the minimum number of times a respective directed edge need be traversed in order to test values in a predetermined test data set. The traversal numbers of the expanded directed graph are balanced to form a symmetric expanded directed graph. An Euler tour and a corresponding unique input-output sequence of the last state of the Euler tour are generated to form the conformance test data sequence. The generated conformance test data sequence exhaustively tests the values in the test data set, and achieves an efficiency in conformance testing by minimizing the amount of time required to perform the conformance test.

9 Claims, 8 Drawing Sheets

OTHER PUBLICATIONS

Miller, R.E., Paul, S., "Generating Maximal Fault Coverage Conformance Test Sequences of Reduced Length for Communication Protocols," IEEE, 1993, pp. 217–224.

Miller R.E., Paul, S., "On the Generation of Minimal-Length Conformance Tests for Communication Protocols", IEEE/ACM Transactions on Networking, vol. 1, No. 1, Feb. 1993, pp. 116–129.

Rapps, S., Weyuker, E.J., " Selecting Software Test Data Using Data Flow Information," IEEE Transactions on Software Engineering, vol. SE–11, No. 4, Apr. 1985, pp. 367–375.

Sabnani, K., Dahbura, A., "A Protocol Test Generation Procedure," North–Holland Computer Networks and ISDN Systems 15, Elsevier Science Publishers B.V., 1988, pp. 285–297.

Sarikaya, B., et al., "A Test Design Methodology for Protocol Testing," IEEE Transactions on Software Engineering, vol. SE–13, No. 5, May 1987, pp. 518–539.

Sidhu, D., Leung, T., "Fault Coverage of Protocol Test Methods," IEEE, 1988, pp. 80–85.

Ural, H., Yang, B., "A Test Sequence Selection Method for Protocol Testing," IEEE Transactions on Communications, vol. 39, No. 4, Apr. 1991, pp. 514–523.

| | INITIAL STATE | FINAL STATE | INPUT TO EFSM | OUTPUT FROM EFSM |
|---|---|---|---|---|
| 1050 → | $v_1$ | $v_2$ | $I_1$ (a = 9, b = 1) | $O_1$ (p = 9) |
| 1060 → | $v_2$ | $v_1$ | $I_2$ (c = 0) | $O_3$ (r = 0) |
| | $v_1$ | $v_1$ | $I_1$ (a = 0, b = 1) | $O_2$ (q = 1) |
| | $v_1$ | $v_2$ | $I_1$ (a = 9, b = 4) | $O_1$ (p = 9) |
| | $v_2$ | $v_1$ | $I_2$ (c = 9) | $O_4$ (s = 9) |
| | $v_1$ | $v_2$ | $I_1$ (a = 5, b = 1) | $O_1$ (p = 5) |
| 1055 → | $v_2$ | $v_1$ | $I_2$ (c = 5) | $O_4$ (s = 5) |
| 1070 → | $v_1$ | $v_2$ | $I_1$ (a = 5, b = 0) | $O_1$ (p = 5) |

FIG. 11

METHOD AND APPARATUS FOR GENERATING CONFORMANCE TEST DATA SEQUENCES

FIELD OF THE INVENTION

This invention relates generally to testing entities that may be characterized as extended finite state machines, and more specifically, to the generation of conformance test data sequences therefor.

Background of the Invention

Protocols are sets of rules governing operations. Telephone communications networks, data networks, and methods for testing VLSI circuits or rule-based expert systems, are some of the items that are governed by standards of particular protocol entities. For example, the data communications protocol X.25 is one protocol implemented in conventional data networks. These networks may interconnect telephone equipment, computers, terminals and other input, output and processing devices, manufactured by different companies. Prior to connection of any new equipment to a network, a network administrator may perform conformance tests on the equipment to make sure that it conforms to the network protocol standard and will not interfere with the network operation.

Equipment that is constructed for connection to a particular network may be regarded as an implementation of the network protocol. Due to human errors, or the incompatibility between protocol implementations and their underlying software or devices, the protocol implementations may not be consistent with their corresponding protocol specification. If such equipment was connected to the network, these inconsistencies might interfere with the operation of the network. Typically, the implementation of a protocol is tested for conformance by applying, by means of an external tester, a sequence of data inputs and verifying that the corresponding sequence of generated outputs is that which is expected.

The generation of the conformance test data sequence may be derived from the characterization of the protocol specification in the form of a finite state machine (FSM), or, for more complex protocols, an extended finite state machine (EFSM). An EFSM consists of a set of inputs, a set of outputs, a set of states, a next-state function which gives the new state of the EFSM for a given input, a given present state and a present value of associated internal variables known as context variables, and an output function. The output function provides the output from the EFSM. The output function also causes a set of actions including the updating of the context variables and the present state. Some of the most common ways to describe EFSMs are natural language descriptions, flow charts, state diagrams, and formal description specification languages such as Specification and Description Language (SDL). A formal specification of an EFSM is a description that is semantically precise.

U.S. Pat. No. 4,991,176, assigned to the assignee of the present invention, discloses a method for generating a conformance test data sequence for communications protocols which are characterized as FSMs. However, this method is directed to generating conformance test data sequences for relatively simple communication protocols that may be characterized as FSM models. As a result, this method is not universally applicable to the more complex systems that may be characterized by EFSM models.

Theoretical methods of testing equipment characterized by EFSMs include those methods described in Samuel T. Chanson and Jinsong Zhu, *A Unified Approach to Protocol Test Sequence Generation*, Proceedings of IEEE INFOCOM '93, pp. 106–114 (March, 1993); and Hasan Ural and Bo Yang, *A Test Sequence Selection Method for Protocol Testing*, IEEE Transactions on Communications, Vol. 39, no. 4 (April, 1991). However, in practice, these methods of testing EFSMs are generally too complex to be used on a frequent basis to test communications equipment. Such methods also present difficulties of generating conformance test data sequences of reasonable length. The length of time required for conformance testing a device is dependent on the length of the conformance test data sequence. As a consequence., current test sequence generation routines for EFSMs are not readily useable for production testing of EFSM implementations.

There are a large number of currently employed communication protocols that may be characterized by a special class of EFSMs in which the context variables may be treated as inputs. These types of EFSMs are usually easier to employ than typical EFSMs. However, the general difficulties and complexities of generating conformance test data sequences for these EFSMs according to prior art techniques are not resolved. As a consequence, a need exists for method and apparatus that generate efficient conformance test data sequences for simplified EFSM protocol entities.

SUMMARY OF THE INVENTION

A method according to the present invention generates a conformance test data sequence of minimal length for evaluating the conformance of a device under test with a protocol entity. A computer testing system may provide the conformance test data sequence to a device under test and observe the corresponding generated output to determine whether the device conforms with the specific protocol entity. The conformance test sequence is preferably generated by first generating a simplified extended finite state machine (EFSM) based on a formal description of the protocol entity. An expanded directed graph of the simplified EFSM is then derived, wherein each state is represented by a state vertex connected to a dummy vertex by a directed edge, and wherein the state and dummy vertices representing each state are connected to one another in a manner corresponding to the operation of the simplified EFSM. Traversal numbers are then assigned to the directed edges based on a predetermined test data set.

A minimal length tour can then be-generated by obtaining a Rural Chinese Postman Tour of the expanded directed graph. In the alternative, the minimal length tour may be generated by making the expanded directed graph symmetric and performing an Euler tour of the symmetric directed graph. A unique input-output sequence is then generated for the final state of the minimal length tour. The conformance test data sequence may then be obtained by concatenating the generated unique input-output sequence to the end of the minimal length tour with the dummy vertices removed.

A conformance test data sequence of minimal length generated in accordance with the present invention minimizes the time required to evaluate the conformance of devices with a protocol entity.

DETAILED DESCRIPTION

A specification for a protocol entity, such as a communications protocol, can be described as an abstract model called an extended finite state machine (EFSM). The EFSM has a finite number of states and changes from one state to another when an input or stimulus is applied to the machine. A state is defined as a stable condition in which the EFSM rests until the next stimulus or input is applied. Each state transition may also cause the EFSM to update context variables or internal variables, and/or generate observable outputs which may be based on the context variables. The particular final state of an EFSM transition upon receipt of an input or stimulus may be dependent on the current EFSM state, the value of the input parameters, and the current value of context variables or internal variables.

Figure 1:
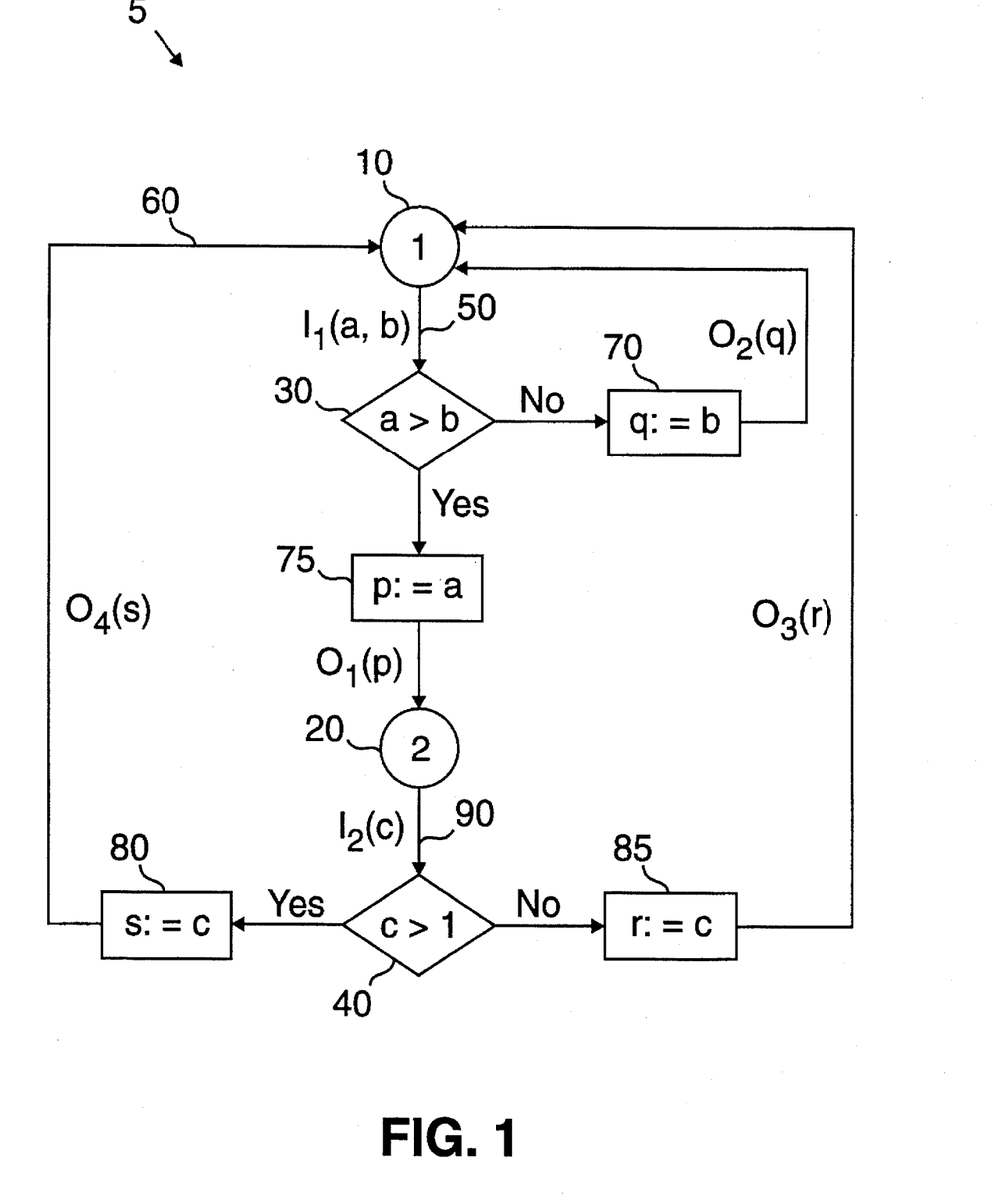
FIG. 1 shows an exemplary extended finite state machine (EFSM) representing a protocol entity.

An example of a simplified EFSM 5 is illustrated in FIG. 1. A simplified EFSM can be generated from a special class of EFSMs in which the context variables or internal variables of the EFSM may be treated as inputs. This simplification of an EFSM may be performed on a large number of currently used communications protocols, such as the Adjunct/Switch Applications Interface (ASAI) protocol described in *Adjunct/Switch Applications Interface Specification*, Issue 1.0, Chap. 5, (AT&T Corp., 1989). Many EFSM protocols may be simplified according to the present invention if the EFSM specification characterizes the protocol in a high level of abstraction. This type of specification is unlike the typical EFSM specifications that have a low level of abstraction to characterize the interaction of several context variables which would require complex data flow analysis in order to generate the conformance test sequence.

The simplified EFSM 5 shown in FIG. 1 is considered deterministic because a particular input parameter symbol causes at most one transition from each state in the machine. As shown in FIG. 1, the simplified EFSM 5 is represented as, and its behavior is described by, a directed graph called a state diagram. In the simplified EFSM 5, nodes 10 and 20 of the graph correspond to states 1 and 2. Conditional or decision blocks 30 and 40, assignment statement blocks 70, 75, 80, 85 and directed edges represented as arrows, such as arrows 50 and 60, characterize the transition from one state to the next in response to received inputs. The state diagram also indicates any outputs that will be generated in response to the received inputs. The directed edges indicate the direction and flow of the operation of the simplified EFSM 5.

Directed edges extending away from the state nodes 10 and 20 have labels that indicate the inputs required to cause a transition out of that respective state. For example, the directed edge 50 extending away from node 10 has a label $I_1(a,b)$ which indicates that the directed edge 50 should be traversed if the parameters a and b are received for the input. $I_1$ while the simplified EFSM 5 is in the state 1. In a similar manner, the directed edges extending into a state have labels, that indicate the outputs to be generated upon a transition into that state. For example, if the simplified EFSM 5 is in state 2, as represented by the node 20, and receives an input $I_2$ with a parameter c having a value of 4, then the machine will traverse directed edges 90 and 60 and an output $O_4$ will be generated with a parameter s having a value of 4. The assignment statement blocks 70, 75, 80 and 85 are utilized for coordinating the input and output information.

A particular sequence of input parameters or data may be identified for a specific EFSM that will cause the EFSM to cycle through each one of its states and generate a corresponding predicted unique sequence of outputs. Such a sequence may be regarded as a conformance test data sequence because it can be applied to a device which is claimed to be an implementation of a particular protocol entity to cause the generation of a sequence of outputs. The sequence of outputs may then be examined in order to verify that the expected sequence of outputs has been produced.

A conformance test data sequence generated according to the present invention has a minimal number of input values which are arranged into a particular sequence to cause all possible state transitions of an EFSM implementation, and to generate a specific sequence of output values. The advantages of using such a conformance test data sequence is the increase in efficiency that is achieved by minimizing the amount of time required for device conformance testing.

Figure 2:
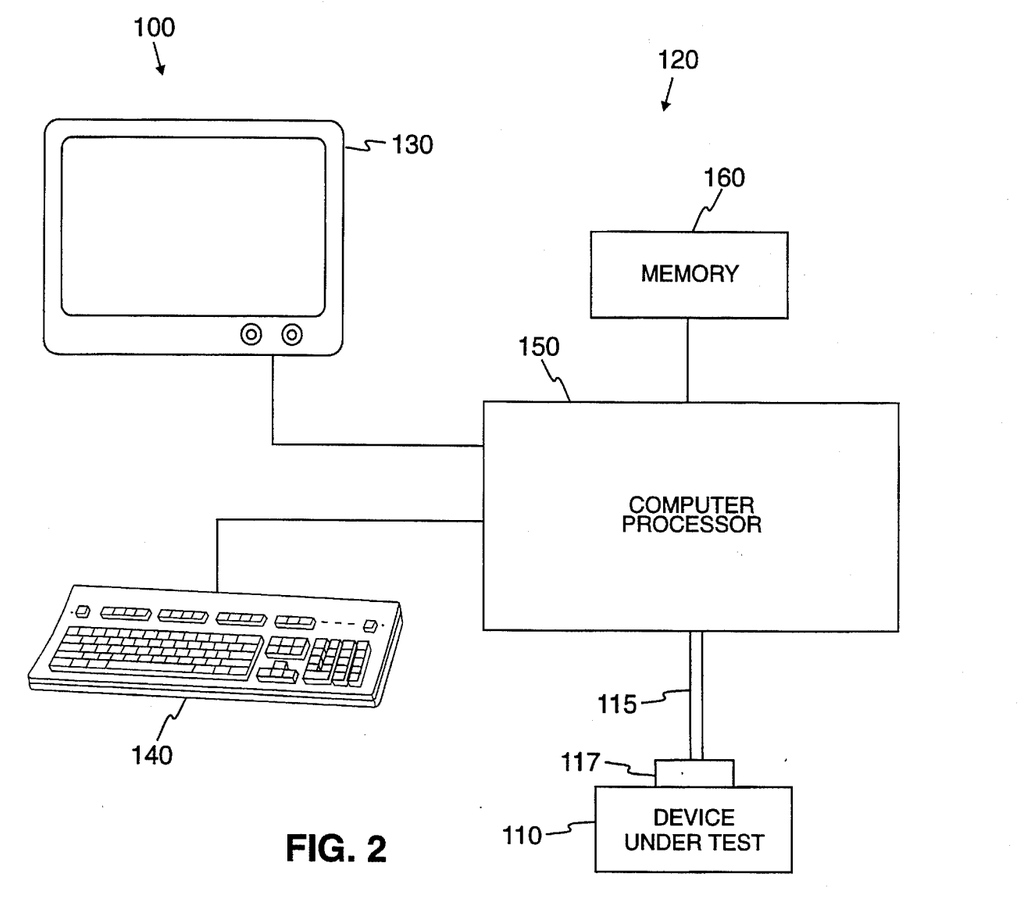
FIG. 2 depicts a testing system which utilizes a conformance test data sequence generated according to the present invention to test the conformance of a device to an EFSM protocol.

FIG. 2 depicts one example of a testing system 100 which may utilize a conformance test data sequence generated according to the present invention to test whether a device 110 conforms to a particular protocol entity such as the simplified EFSM 5 illustrated in FIG. 1. Referring to FIG. 2, the testing system 100 includes a computer system 120 connected to the device 110. The device 110 may suitably comprise a new network node, such as telephone terminal equipment.

The computer system 120 provides the conformance test data sequence to the device 110, and examines the corresponding output data generated by the device 110. The computer system 120 then identifies whether a discrepancy exists between the output data sequence generated by the device 110 and the expected output sequence according to the particular EFSM protocol. The conformance test data sequence may also be generated by the computer system 120, or by a similar computer off-line.

The computer system 120 may suitably be a programmed computer that comprises an output device such as a display monitor 130, an input device such as a computer keyboard 140, a computer processor 150, and a memory unit 160. The computer processor 150 is connected to the output device 130, the memory unit 160, and the input device 140. The memory unit 160 may be used for the storage of data, program code and the test data sequence.

The computer processor 150 is connected to a test communications line 115 having a device interface 117. The device interface 117 is connected to the device 110 under test. The computer processor 150 communicates with the device 110 over the test communications line 115. The testing functions of the computer system 120 are performed by the computer processor 150 by executing program code which is stored in the memory unit 160. The computer system 120 may suitably be any one of the types which are well known in the art, such as a mainframe computer, a minicomputer, a workstation, or a personal computer.

Figure 3:
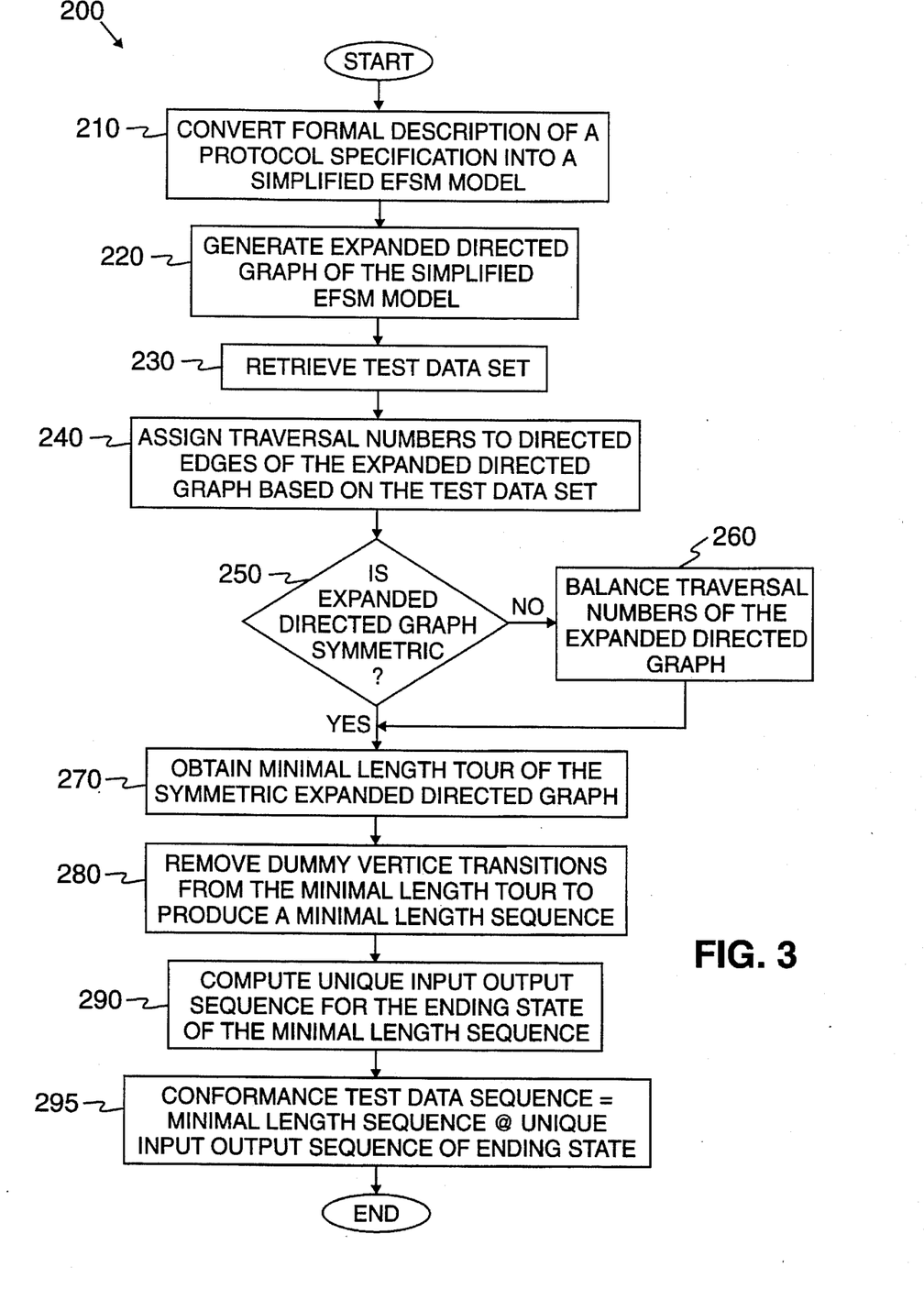
FIG. 3 is a flow diagram of a method according to the present invention for generating a conformance test data sequence suitable for use in the system of FIG. 2.

A method 200 for generating the conformance test data sequence according to the present invention is shown in FIG. 3. Referring to FIG. 3, in step 210, a formal description or specification of the communications protocol is converted into a simplified EFSM model. For example, a specification in the Specification and Description Language (SDL) of the protocol represented by the simplified EFSM 5 depicted in FIG. 1 is as follows:

```
MODEL Example_proc;
START;
    NEXTSTATE 1;
STATE 1;
    INPUT I1(a,b);
        DECISION 'a > b';
            (NO): TASK 'q = b';
                OUTPUT O2(q);
                NEXTSTATE 1;
            (YES): TASK 'p = a';
                OUTPUT O1(p);
                NEXTSTATE 2;
        ENDDECISION;
ENDSTATE 1;
STATE 2;
    INPUT I2(c);
        DECISION 'c > 1';
            (NO): TASK 'r = c';
                OUTPUT O3(r);
                NEXTSTATE 1;
            (YES): TASK 's = c';
                OUTPUT O4(s);
                NEXTSTATE 1;
        ENDDECISION;
ENDSTATE 2;
ENDMODEL Example_proc.
```

Although the above formal description does not contain context variables, if context variables were part of the specification they would be treated as inputs in the generation of the corresponding simplified EFSM 5. For instance, if a context variable D was used to determine the final state of a state transition from state 1 or node 10, the input label of the directed edge 50 would also include the variable D if the variable D was not dependent on the input parameters a and b.

Figure 4:
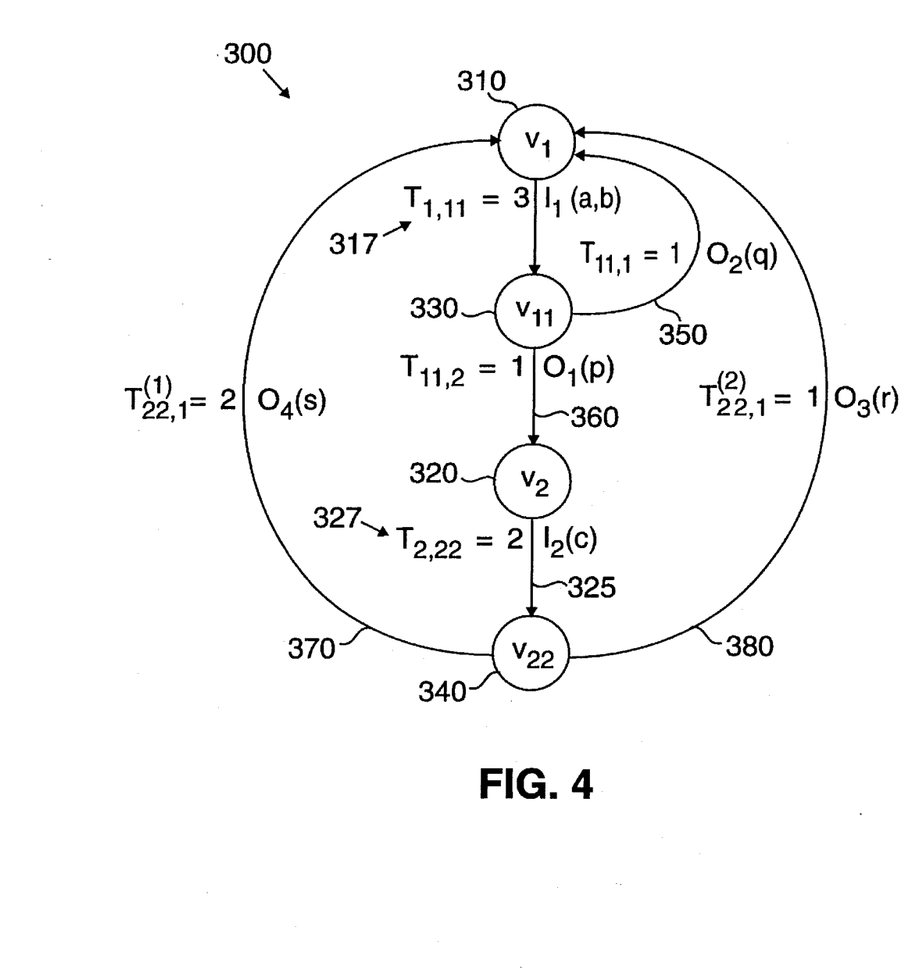
FIG. 4 is an expanded directed graph of the EFSM of FIG. 1.

After generating the simplified EFSM, the test data sequence generation routine 200 generates an expanded directed graph of the simplified EFSM in step 220. The manner in which an EFSM is characterized in a directed graph will determine the specific test sequence that may be generated. The expanded directed graph of the present invention facilitates the generation of a conformance test data sequence of minimal length. The expanded directed graph differs from conventional directed[graphs used to represent EFSMs by utilizing a dummy vertex in addition to a state vertex to characterize each state of the simplified EFSM. An expanded directed graph 300 of the simplified EFSM 5 of FIG. 1 is shown in FIG. 4. One suitable method for generating an expanded directed graph is described below with respect to FIGS. 4–6.

After the expanded directed graph of the simplified EFSM is generated in step 220, a suitable test data set corresponding to the simplified EFSM is retrieved in step 230. A test data set is a set of input parameters which must be applied, and output parameters which must be evaluated for conformance testing of a device. The particular values of the input parameters and output parameters in the test data set may be specified by designers or conformance testers of the protocol entity. The test data set facilitates the exercise of a state transition several times with different values of the same input and output parameter that may be required to verify that the operation of a device exactly conforms to the protocol entity.

For example, consider a transition $$S_1 \overset{I1(phno)/O1(status)}{\rightarrow} S_2$$

which takes an input parameter "phno", changes from a state $S_1$ to a state $S_2$, and produces an output parameter "status". Values of the output parameter status are 'invalid', 'local', 'domestic' or 'international' depending on the value of the input parameter "phno". The test data set for such a transition may be given in the form of the following input-output table 1.

TABLE 1

| Input ("phno") | Output ("status") |
|---|---|
| 000 0000 | 'invalid' |
| 888 0000 | 'local' |
| 1 301 888 0000 | 'domestic' |
| 011 91 55 888 0000 | 'international' |

In Table 1, the transition in question will be considered tested if each value listed of the input parameter "phno" is provided to the device under test, and the corresponding listed value of the output parameter "status" is observed.

The number of values for which the input parameters need to be tested need not be the same as the number of values for which the output parameters need to be tested. For example, there may be additional requirements for the input parameter "phno". It may be required to test the given transition with phno=999 9999, 1 999 999 9999 and 011 99 99 999 9999 in addition to the four values already specified. If the output parameter "status" can have only the four values listed in Table 1, the number of values for which the input and the output parameters need to be tested in the test data set are different. In an alternative embodiment of the test sequence generation routine 200 of FIG. 3, retrieval of the test data set in step 230 may be performed before generation of the expanded directed graph in step 220.

After retrieval of the test data set and generation of the expanded directed graph in steps 220 and 230 of the routine 200, traversal numbers for each directed edge of the expanded directed graph are assigned in step 240. A traversal number represents the minimum number of times the corresponding directed edge must be traversed in order to test the conformance of a device according to the structure of the expanded directed graph and the retrieved test data set. For clarity, traversal numbers have been used instead of the equivalent replicating of the directed edges between respective vertices a like number of times. Each directed edge must be traversed at least once during conformance testing. As a consequence, the minimum value of a traversal number is 1.

A traversal number may be greater than the value 1 if the input or output parameters associated with the corresponding directed edge require testing for more than one value based on the retrieved test data set. In such an instance, the traversal number would be equal to the minimum number of times the input or output parameters for the corresponding directed edge require testing. One method for assigning traversal numbers is described below with reference to the expanded directed graph 300 of FIG. 4.

After assignment of the traversal numbers for the expanded directed graph in step 240 in FIG. 3, the test sequence generation routine 200 determines, in step 250, whether the assigned traversal numbers of the expanded directed graph are symmetric. An expanded directed graph is considered to be symmetric if the sum of the traversal numbers for the directed edges extending into each vertex is equal to the sum of the traversal numbers for the corresponding directed edges extending out of each vertex. If it is determined that the expanded directed graph is symmetric, the test data sequence generation routine 200 proceeds to step 270. However, if the expanded directed graph is not symmetric, the routine 200 proceeds to step 260 where the traversal numbers of the expanded directed graph are balanced to produce a symmetric expanded directed graph.

Figure 9:
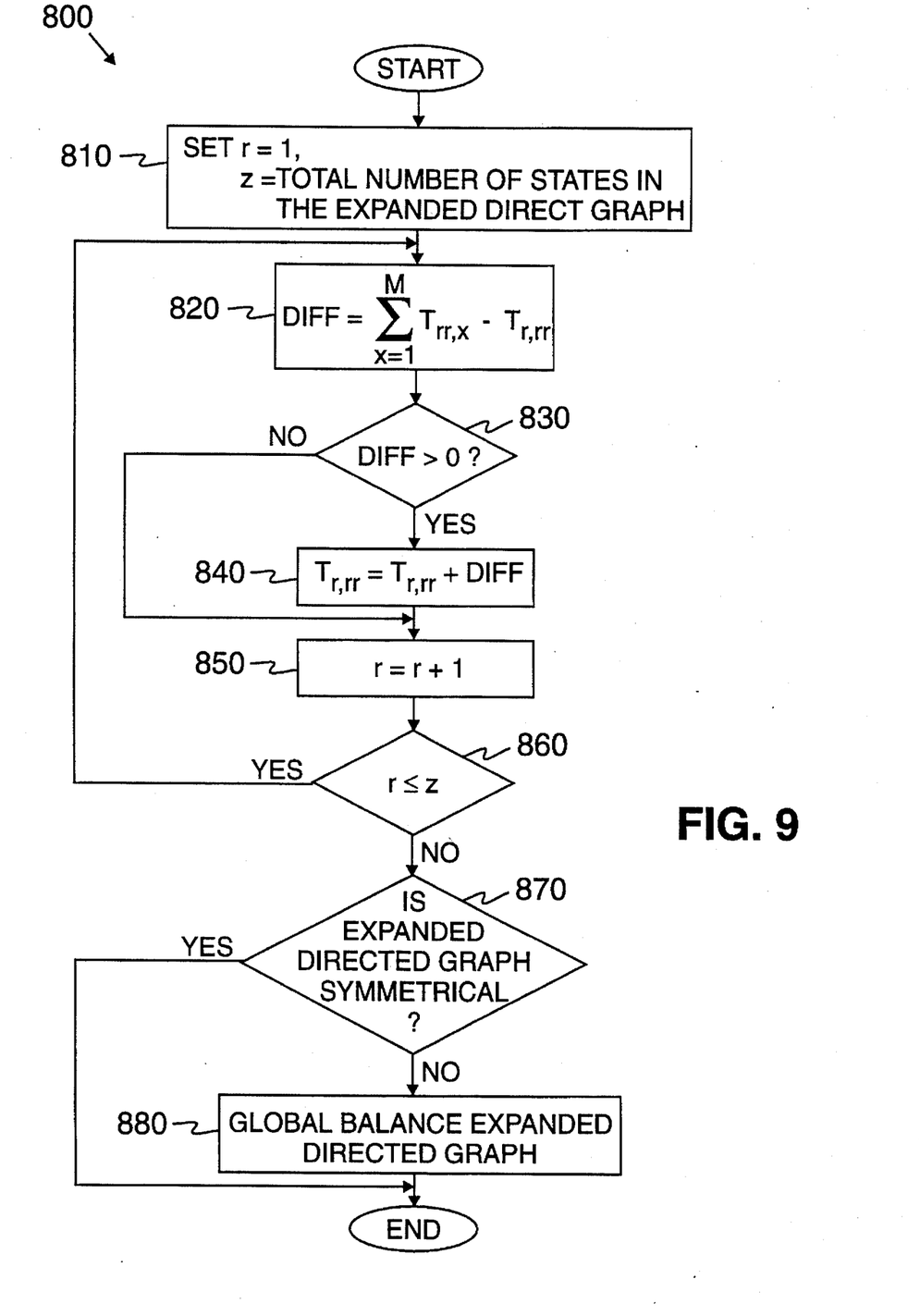
FIG. 9 is a flow diagram of a method for balancing traversal numbers of an expanded directed graph for use in the method of FIG. 3.
Figure 10:
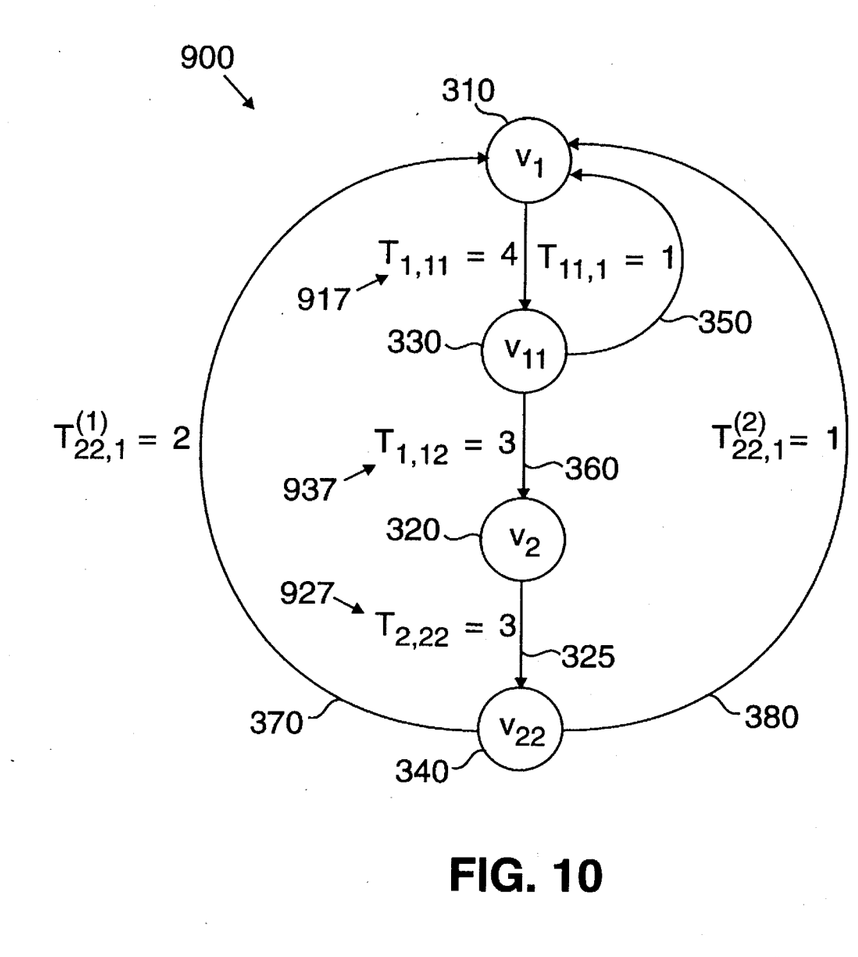
FIG. 10 is a symmetric expanded directed graph corresponding to the expanded directed graph of FIG. 4.

One suitable method 800 for balancing the traversal numbers of the expanded directed graph is illustrated in FIG. 9 which is described below. An example symmetric expanded directed graph 900 corresponding to the expanded directed graph 300 of FIG. 4 is shown in FIG. 10 which is also described below.

After a symmetric expanded directed graph is identified in step 250, or is obtained in step 260, a minimal length tour of the symmetric expanded directed graph is generated in step 270. A tour is a path in a directed graph that starts and ends at the same vertex. A path is defined as a non-null sequence traversal of consecutive directed edges. The minimal length tour, known as an Euler tour, traverses each directed edge of the symmetric expanded directed graph the number of times specified by the corresponding directed edge traversal numbers. The manner in which an Euler tour is generated for a directed graph is known in the art, and one such technique is Fleary's Algorithm which is disclosed in James A. McHugh, *Algorithmic Graph Theory*, Sect.1.7, pp. 42–44 (Prentice Hall, Inc., 1990), ("McHugh"), which is hereby incorporated by reference. An Euler tour of a symmetric expanded directed graph generated according to the present invention traverses each directed edge of the graph exactly the number of times specified by the corresponding traversal number to test each input and output parameter of the corresponding test data set.

After generation of the minimal length tour in step 270, the dummy vertices are removed from the minimal length tour to form a minimal length sequence in step 280 upon removal of the dummy vertices from the minimal length tour, the input parameters of the directed edges extended into the dummy vertices, and the output parameters of the directed edges that extended away from the dummy vertices are combined. The dummy vertices are removed because they were only created to facilitate generation of the minimal length tour.

The routine 200 then proceeds to step 290, where a unique input-output (UIO) sequence is generated for the ending state of the minimal length sequence. A UIO sequence comprises a particular series of inputs that may be applied to a machine that generates a sequence of outputs only if the machine was in that given state. For instance, when the input data specified by the UIO sequence of state $s_i$ is applied to an EFSM, the output data specified in the UIO sequence would be generated by the machine only if the machine was actually in state $s_i$. Techniques for generating UIO sequences for EFSMs are well known in the art. One technique for generating a minimum length UIO sequence is disclosed in U.S. Pat. No. 4,692,921, which is hereby incorporated by reference.

Figure 11:
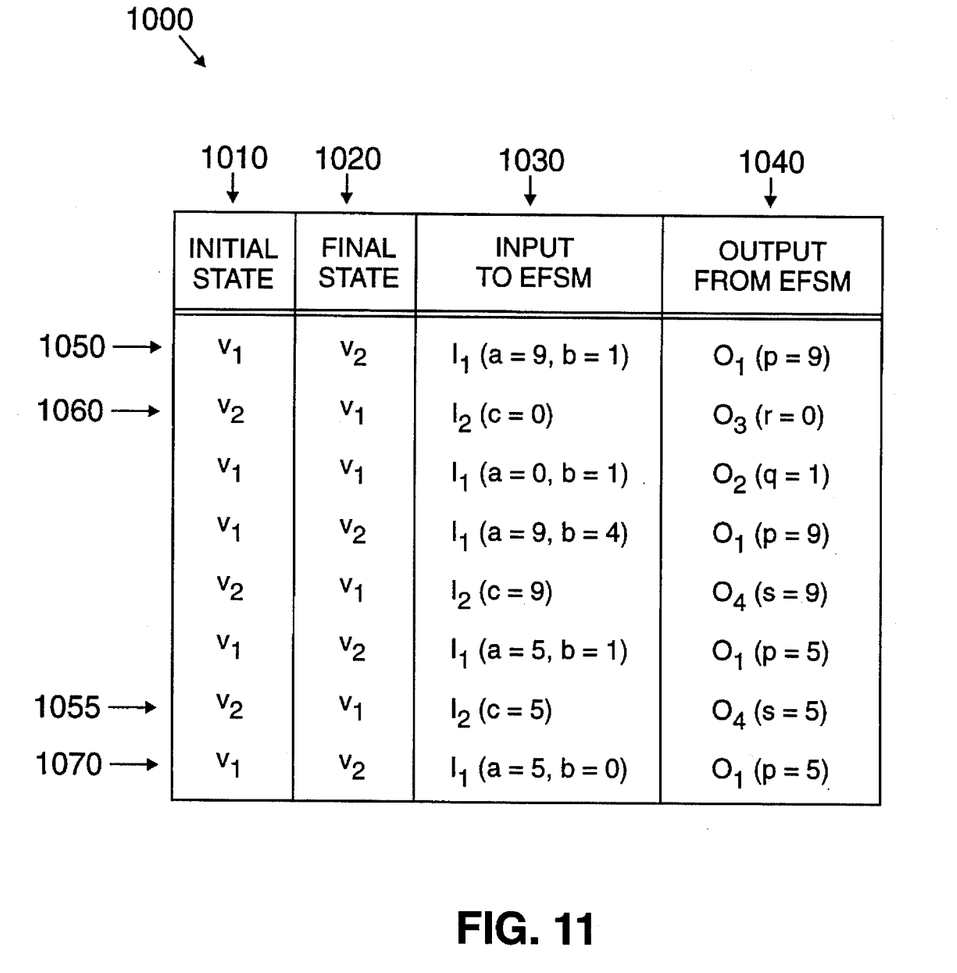
FIG. 11 is a table of the conformance test data sequence for the simplified EFSM of FIG. 1 generated according to the present invention.

The generated UIO sequence is then concatenated to the end of the minimal length sequence in the final step 295 of the routine 200 to form the desired conformance test data sequence. The UIO sequence concatenated to the minimal length sequence verifies not only the ending state after execution of the minimal length sequence, but also each of the intermediate states. This property of a minimal length tour concatenated with a corresponding UIO sequence is described in Raymond E. Miller and Sanjoy Paul, *On the Generation of Minimal Length Conformance Tests for Communication Protocols*, IEEE/ACM Transactions on Networking, Volume 1, No. 1, (February, 1993), ("Miller and Paul"), which is hereby incorporated by reference=. A table 1000 of the conformance test data sequence for the simplified EFSM 5 of FIG. 1 is illustrated in FIG. 11.

In an alternative embodiment of the test sequence generation routine 200 of FIG. 3, a Rural Chinese Postman Tour, which is well known in the art, may suitably be used to generate the minimal length tour from the expanded directed graph. In such an embodiment, the Rural Chinese Postman Tour is used in place of performing steps 250–270 to generate the minimal length tour of step 270. The conformance test data sequence can then be generated from such a minimal length tour in the manner described in steps 280–295. A suitable Rural Chinese Postman Tour technique for the alternative embodiment of the present invention is disclosed in A. Aho, A. T. Dahbura, D. Lee, and M. Umit Uyar, "An Optimization Technique For Protocol Conformance Test Generation Based on UIO Sequences and Rural Chinese Postman Tours," *Symposium of Protocol Specification*, Testing and Verification, (1988), which is hereby incorporated by reference.

A more detailed description of the steps of the test sequence generation routine 200 of FIG. 3 is given with respect to the following example. According to the first step 210 of FIG. 3, a formal description of a protocol is converted into a simplified EFSM model. For this example, the formal description in the SDL language is given above and the corresponding simplified EFSM 5 generated thereby is shown in FIG. 1.

Then according to step 220 of FIG. 3, an expanded directed graph is generated based on the simplified EFSM model. One suitable method for generating an expanded directed graph in step 220, such as the expanded directed graph 300 of FIG. 4 which corresponds to the simplified EFSM model 5, is a basic transition element ("bte") technique. According to the bte-based generation method, an expanded directed graph is generated by (1) identifying all bte's of the simplified EFSM; (2) generating their corresponding expanded directed subgraphs; and (3) connecting the generated bte expanded directed subgraphs to one another to form the expanded directed graph.

A basic transition element or bte corresponds to one state transition of the simplified EFSM. A protocol entity which is characterized by a simplified EFSM may be represented as an interconnected collection or set of the bte's. Thus, in step (1) of the bte-based directed graph generation method, respective bte's for each of the possible state transitions of the simplified EFSM must be identified and included in a set of bte's that represent the simplified EFSM.

Figure 5:
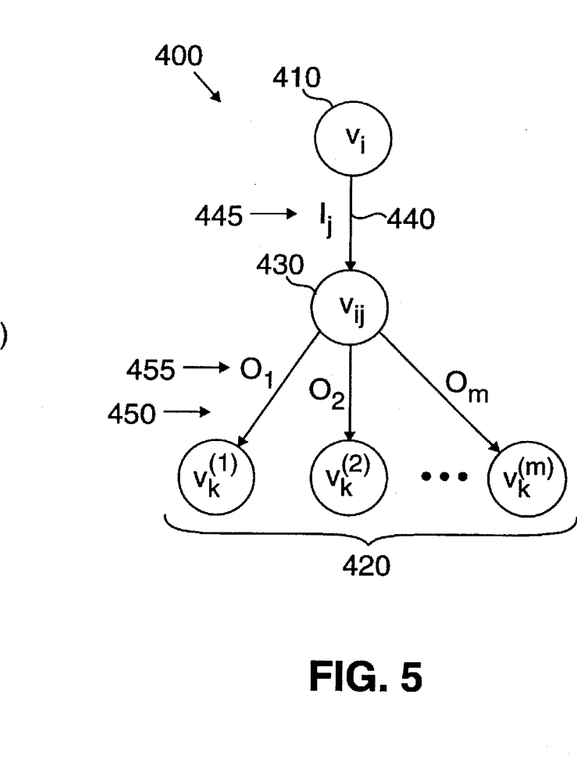
FIG. 5 is one type of general expanded directed subgraph of a basic transition element for use in constructing an expanded directed graph, Such as the expanded directed graph of FIG. 4.
Figure 6:
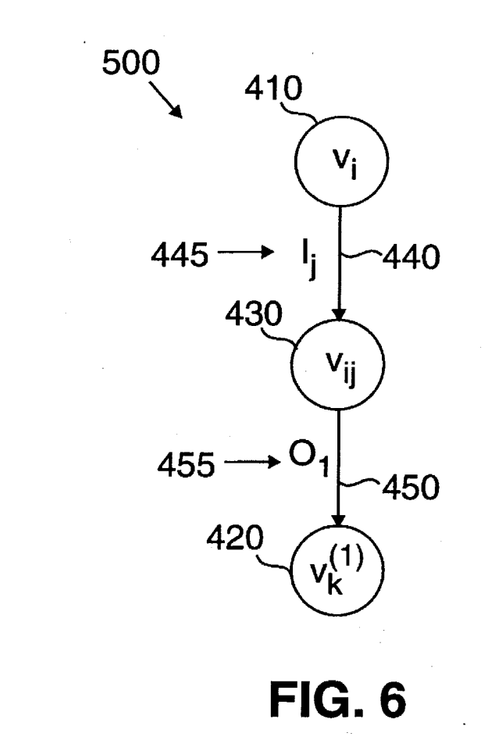
FIG. 6 is a second type of general expanded directed subgraph of a basic transition element for use in constructing an expanded directed graph.

In step (2) of the above bte-based direct graph generation method, subgraphs for the identified bte's are generated. General examples of the two types of expanded directed subgraphs 400 and 500 of basic transition elements are shown in FIGS. 5 and 6, respectively. The first type of expanded directed subgraph 400, shown in FIG. 5, is utilized for those state transitions which are dependent upon the operation of a conditional block. The expanded directed subgraph 400 characterizes a transition from a starting state $v_i$, as represented by the vertex 410, to one state in a set of final states $v_k^{(1)}$, $v_k^{(2)}$, ..., $v_k^{(m)}$, as represented by the vertices 420, where m is the total number of possible final states. A conditional block in the simplified EFSM that determines which one of the set of final states $v_k^{(1)}$, ..., $v_k^{(m)}$, during execution of a transition is represented by a dummy vertex $v_{ij}$ as indicated by reference number 430.

A directed edge 440 from the vertex 410 to the dummy vertex 430 indicates the transition flow within the bte 400 upon receipt of an input $I_j$ as shown by a directed edge label 445. Indices i and j of the dummy vertex $v_{ij}$ correspond to the index of the starting state $v_i$ and the index of the input $I_j$, respectively. A plurality of directed edges 450 extend from the vertex $v_{ij}$ to a corresponding one of the final state vertices 420. Each one of the plurality of directed edges 450 is labeled with a respective output label $O_1$, $O_2$, ..., $O_m$, which are collectively shown by the reference number 455.

FIG. 6 depicts the second type of expanded directed subgraph 500 for a bte that does not have a conditional block. Similar elements in FIGS. 5 and 6 are like numbered for clarity, for example, the starting state is represented by a vertex 410, the dummy vertex $v_{ij}$ as shown by a circle 430 and the directed edge 440. Since no conditional block exists for the transition in the simplified EFSM corresponding to the bte 500 of FIG. 6, the bte 500 operates as a direct transition from the starting state $v_i$ or vertex 410, to a final state $v_K^{(1)}$ represented by the vertex 420 upon receipt of input $I_j$. However, the dummy vertex $v_{ij}$, as shown by the circle 430, is still employed between the vertices 410 and 420 despite the lack of the corresponding conditional block. The use of the dummy vertex 430 in this type of bte facilitates the generation of a corresponding conformance test sequence of minimal length. The single directed edge 450 extends from the vertex 430 to the vertex 420 and is labeled with an output $O_1$ as shown by reference number 455.

If the starting state $v_i$ as shown by the vertex 410 of an expanded directed subgraph 500 of FIG. 6 is one of the final states of another expanded directed subgraph, such as one of the vertices 420 of the subgraph 400 of FIG. 5, then the subgraphs can be combined to form a larger subgraph of the expanded directed graph. Accordingly, in step (3) of the bte-based direct graph generation method, the respective bte's generated in step (2) are combined to form an expanded directed graph.

Applying the bte-based directed graph generation method to the simplified EFSM 5 of FIG. 1 produces the expanded directed graph 300 shown in FIG. 4. According to step (1) of the method, the bte's of the simplified EFSM 5 of FIG. 1 correspond to each one of its states. Thus, the bte's for the simplified EFSM 5 correspond to states 1 and 2, represented by nodes 10 and 20, respectively. Further, both nodes 10 and 20 have associated conditional blocks 30 and 40, and therefore, correspond to the type of bte shown in FIG. 5.

Figure 7:
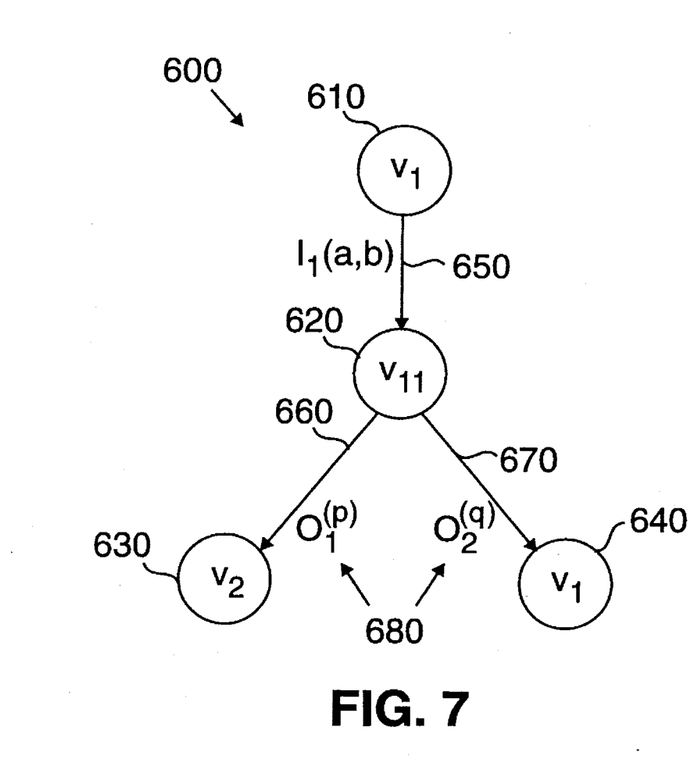
FIG. 7 is a first basic transition element subgraph for constructing the expanded directed graph of FIG. 4.
Figure 8:
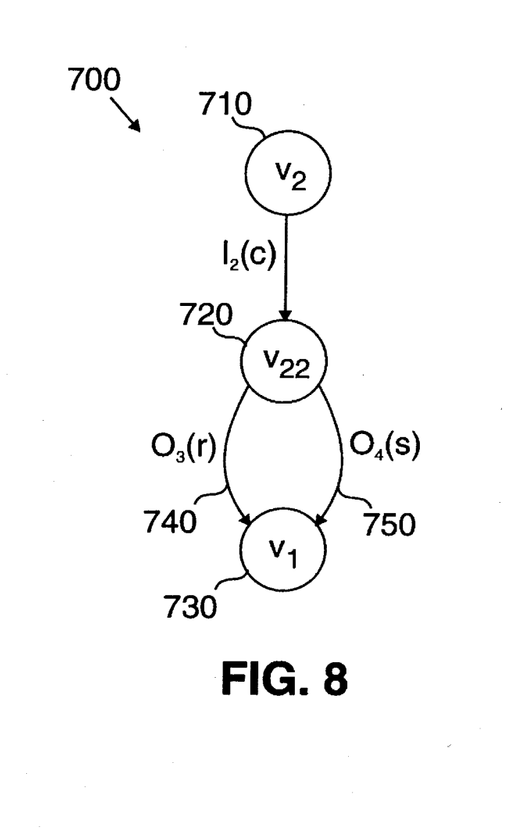
FIG. 8 is a second basic transition element subgraph for constructing the expanded directed graph of FIG. 4.

FIGS. 7 and 8 depict two expanded directed subgraphs 600 and 700 produced according to step (2) of the bte-based directed graph generation method. These subgraphs correspond to the bte's that make up the simplified EFSM 5 of FIG. 1. Referring to FIG. 7, the bte expanded directed subgraph 600 depicts the transitions of the simplified EFSM 5 where the initial state is the state 1 represented by the node 10. As a consequence, the bte 600 is formed by a vertex $v_1$ represented by a circle 610 corresponding to the node 10 of FIG. 1, a dummy vertex $v_{11}$ represented by the circle 620 corresponding to the conditional block 30 of FIG. 1, and final state vertices $v_2$ and $v_1$ shown by the circles 630 and 640, representing the final states 1 or 2, respectively.

Directed edges 650, 660 and 670 connect the vertices in the bte subgraph 600 in a manner corresponding to that of the general model 400 in FIG. 5. For example, the directed edge 650 extending away from the initial state vertex 610 corresponds to the directed edge 50 of FIG. 1, and has the same input label of $I_1(a, b)$. In a similar manner, the directed edges 660 and 670 correspond to those directed edges extending into states 2 and 1 indirectly from the conditional block 30, and have like output labels $O_1(p)$ and $O_2(s)$ as represented collectively by reference number 680. The vertices 610 and 640 represent the same vertex $v_1$ and may be combined into a single vertex having the directed edge 660 extending away from it and the directed edge 670 extending into it.

The bte 700 of FIG. 8 is constructed in a similar manner to the bte 600 of FIG. 7 and represents the state transitions where the initial state is state 2, or node 20, of FIG. 1. Referring to FIG. 8, a vertex $v_2$ represented by circle 710 corresponds to the node 20 of FIG. 1, a dummy vertex $v_{22}$ represented by circle 720 corresponds to the conditional block 40 of FIG. 1, and vertex $v_1$ shown by the circle 730 corresponds to the node 10 of FIG. 1. Two directed edges 740 and 750 extend into the same vertex $v_1$ to illustrate the manner in which vertices representing the same state may be combined in a graph.

In a similar manner to combining vertices within a subgraph, vertices of two or more subgraphs may be combined in forming the expanded directed graph. Accordingly, in step (3) of the bte-based generation method, the expanded directed subgraphs 600 and 700 of FIGS. 7 and 8 are combined to form the expanded directed graph 300 of FIG. 4. In combining the subgraphs 600 and 700, the vertices for $v_1$ and $v_2$ are combined respectively in the manner described above with respect to FIG. 8. Thus, vertex $v_1$ as represented by the circles 610 and 640 of FIG. 7 and the circle 730 of FIG. 8 are combined and represented by the circle 310 of the expanded directed subgraph 300 in FIG. 4. The vertices 630 and 710 representing the vertex $v_2$ are combined and represented by the circle 320 in FIG. 4.

In FIG. 4, directed edges 350 and 360 extending between the vertex $v_{11}$ and vertices $v_1$ and $v_2$, respectively, correspond to the conditional block 30, or a>b, evaluating to "NO" and "YES", respectively. In a similar manner, directed edges 370 and 380 extending between the vertex $v_{22}$ and the vertex $v_1$ correspond to the conditional block 40, or c>1, evaluating to "NO" and "YES", respectively. Thus, an expanded directed graph for a simplified EFSM with any number of states may be readily generated by the bte-based directed graph generation method set forth above.

Alternatively, the expanded directed subgraph 300 of FIG. 4 may be formed by combining the steps of the bte-based generation method. In this alternative method, the expanded directed graph 300 is formed by replacing the nodes 10 and 20 of the simplified EFSM 5 of FIG. 1 with vertices $v_1$ and $v_2$ as represented by the circles 310 and 320, respectively, and by replacing the conditional blocks 30 and 40 with dummy vertices $v_{11}$ and $v_{22}$, as represented by circles 330 and 340, respectively.

After the expanded directed graph 300 is generated, a test data set for the protocol is retrieved according to the test sequence generation routine 200 of FIG. 3. An example test data set corresponding to the simplified EFSM 5 of FIG. 1 is as follows:

| Parameters | Values |
|---|---|
| a | 0, 5, 9 |
| b | 1, 4 |
| p | 9 |
| q | 0 |
| c | 0, 9 |
| r | 0 |
| s | 5, 9 |

The above parameters must be tested for the corresponding listed values in order to evaluate the conformance of a device under test with the protocol.

Then according to step 240, traversal numbers are assigned to the directed edges of the expanded directed graph 300 based on the values of the retrieved test data set. As stated above, a traversal number represents the minimum number of times the input or output parameters need to be tested for a particular directed edge. For example, according to the test data set listed above, the input parameter c for the input $I_2(c)$ associated with the directed edge 325 of the expanded directed graph 300 of FIG. 4, must be tested for two values 0 and 9. Therefore, a traversal number $t_{2,22}$ for the directed edge 325 is assigned a value 2, as shown by the reference number 327, which indicates that the directed edge 325 must be traversed at least two times during the conformance testing. Accordingly, the directed edge 325 must be traversed at least once for each test value of the parameter c for the input $I_2$. The indices "2,22" of the label 327 indicate that the traversal number corresponds to the directed edge 325 that extends from the vertex $v_2$ to the dummy vertex $v_{22}$.

The traversal numbers for the other directed edges 315, 360, 370 and 380 in FIG. 4 have been assigned in a substantially similar manner to that of the directed edge 325. The traversal number labels for the directed edges 370 and 380 which both extend between vertices $v_{22}$ and $v_1$ have superscripts "(1)" and "(2)" for differentiation. A traversal number should be assigned a value 1 for those directed edges having no input or output parameters. Likewise, a traversal number should be assigned a value 1 for a single input or output parameter if the test data set provides no indication that a specific value be tested for that parameter.

If more than one input or output parameters are associated with a particular directed edge, then the traversal number assigned to that directed edge is further based on the dependency of the parameters on one another. For example, the input $I_1$ associated with the directed edge 315 in FIG. 4 has two parameters a and b. If the parameters a and b are independent, then the traversal number assigned to the directed edge is the maximum number of values that either a or b must be tested according to the test data set listed above. A parameter is considered independent from another parameter if it may take on any value in its permitted range without affecting the constraints on the value of the other input parameter.

According to the test data set the parameter a must be tested with the values 0, 5 and 9 and the parameter b must be tested with the values 1 and 4. There is no indication in the test data set or in the simplified EFSM 5 of FIG. 1 that the parameters a and b are dependent on one another. Thus, the traversal number $T_{1,111}$ is assigned a value 3, as indicated by a label 317 in FIG. 4, because it is the maximum number either parameter a or b must be evaluated with during conformance testing.

However, if the parameters a and b were not independent then the corresponding traversal number needs to be changed accordingly. In such an instance, the traversal number $T_{1,11}$ must be assigned a value equal to the greater of the sum of the dependent parameter combinations or the maximum number any one of the parameters needs to be tested according to the test data sequence. For instance, if the parameters a and b were not independent upon each other then the directed edge 315 may have to be traversed with particular combinations of the parameters a and b. In the above stated example, the directed edge 315 would have to be traversed a maximum of six times since the parameters a and b must be tested with three and two values, respectively.

According to the test sequence generation routine 200 of FIG. 3, once the traversal numbers have been assigned to the directed edges of the expanded directed graph 300, the routine 200 determines in step 250 whether the expanded directed graph 300 is symmetric. To this end, step 250 determines whether the traversal numbers of the directed edges entering each one the vertices are equal to the summation of the traversal numbers for the corresponding directed edges extending away from the vertices.

Consider for example, the expanded directed graph 300 of FIG. 4 which is not symmetric because the respective traversal numbers of the vertices 320, 330 and 340 are not balanced. The traversal number $T_{11,2}$ for the directed edge 360 extending into the vertex 320 is a 1, which is not equal to the traversal number $T_{2,22}$ for the directed edge 325 extending away from the vertex 320 which is a 2. Therefore, the test sequence generation routine 200 proceeds to step 260 where the traversal numbers of the expanded directed graph 300 are balanced to generate a symmetric expanded directed graph. FIG. 9 illustrates one suitable method 800 for balancing the traversal numbers of an expanded directed graph.

Referring to the method 800 of FIG. 9, in step 810, a counter r is set to 1 and a state total z is set to the total number of states in the expanded directed graph. Then, in step 820, a difference value DIFF is defined as the difference between the traversal number $T_{r,rr}$ extending into a dummy vertex $v_{rr}$ and the summation of the traversal numbers $T_{rr,x}$ for the directed edges extending away from the dummy vertex $v_{rr}$, where a value M indicates the total number of directed edges extending away from the vertex $v_{rr}$. For example, in the expanded directed graph 300 of FIG. 4, when the counter r is equal to 1, the traversal number $T_{1,11}$ is a 3 as shown by the label 317, and the summation of the traversal numbers $T_{11,1}$ and $T_{11,2}$ for the directed edges 350 and 360 extending away from the dummy vertex $v_{11}$ is 2. As a consequence, the difference value DIFF is −1 (2−3).

Upon computing the difference value DIFF, the method 800 determines whether local balancing of the dummy vertex $v_{rr}$ is required by testing the value DIFF in step 830. If the difference value DIFF is less than or equal to zero in step 830, then no local balancing of the dummy vertex $v_{rr}$ is required, and the method 800 proceeds to step 850. However, if in step 830, the value DIFF is a positive number, the method 800 proceeds to step 840 where local balancing of the dummy vertex $v_{rr}$ is performed by increasing the traversal number $T_{r,rr}$ by the difference value DIFF. That is, the number of times the directed edge $T_{r,rr}$ entering the dummy vertex $v_{rr}$ is to be traversed will be equal to the total number of times the directed edges $T_{rr,x}$ extending away from the dummy vertex $v_{rr}$ need to be traversed.

Upon completing step 840, the method 800 proceeds to step 850 where the counter r is incremented. Then, in step 860, the counter r is tested, and if less than or equal to the state total z, the method 800 performs steps 820–850 again for the next dummy vertex until all the dummy vertices in the expanded directed graph have been processed for local balancing.

For example, in local balancing the expanded, directed graph 300 of FIG. 4 according to steps 810–860 of the method 800 of FIG. 9, the traversal number $T_{2,22}$ of the directed edge 325 is increased from a 2 to a 3. The traversal number $T_{2,22}$ is increased because the summation of the traversal numbers $T_{22,1}^{(1)}$ and $T_{22,1}^{(2)}$ of the directed edges 370 and 380 extending away from the dummy vertex $v_{22}$ is a 3 producing a corresponding difference value DIFF of 1.

After local balancing of an expanded directed graph in steps 810–860, the method 800 proceeds to step 870. In step 870, the expanded directed graph is once again evaluated to determine if it is symmetric. If the expanded directed graph is symmetric, the balancing method 800 has completed its task. In the alternative, if the expanded directed graph is not symmetric, global balancing is performed on the graph in step 880 using minimal symmetric graph augmentation techniques well known in the art. One well known minimal symmetric augmentation technique is a minimum-cost maximum-flow method according to the Ford and Fulkerson Algorithm which is described in McHugh, Sect. 6.4, pp. 190–197, which is hereby incorporated by reference. Upon completing step 880, the expanded directed graph will be symmetric. A symmetric expanded directed graph 900 generated according to the method 800 of FIG. 9 based on the expanded directed graph 300 of FIG. 4 is shown in FIG. 10.

The vertices and directed edges of the expanded directed graphs of FIGS. 4 and 10 are like numbered for clarity, for example, vertices 310 and 320, and directed edges. 315, and 325. Referring to FIG. 10, the directed edge 325 extending into the dummy vertex $v_{22}$ has been local balanced with a traversal number $T_{2,22}$ having a value 3, as represented by directed edge label 927. In addition, after completing global balancing, the traversal numbers $T_{1,11}$ and $T_{11,2}$ for the directed edges 315 and 360 have been updated to 4 and 3, as represented by the labels 917 and 937, respectively. The expanded directed graph 900 illustrated in FIG. 10 is symmetric because the sum of the traversal numbers for the directed edges entering each vertex is equal to the sum of the traversal numbers for the corresponding directed edges exiting the vertex.

According to the test sequence generation routine 200, upon obtaining a symmetric expanded directed graph, a minimal length tour or Euler tour of the graph is generated in step 270. The Euler tour of the symmetric expanded directed graph may be generated according to Fluery's Algorithm. An Euler tour for the minimally augmented symmetric graph 900 starting with the vertex $v_1$ is as follows:

This Euler tour traverses each directed edge of the symmetric graph 900 exactly the number of times specified by the corresponding traversal number to specifically test each input and output parameter of the above listed test data set. For example, the directed edge 315 between vertices $v_1$ and $v_{11}$ of FIG. 10 is traversed three times to exercise the input $I_1(a,b)$ with the three values 9, 0 and 5 for the parameter a, satisfying the requirement of the corresponding test data set.

After generating the above-listed minimal length tour, the test sequence generation routine 200 removes the dummy vertices from the tour in step 280 to form a minimal length sequence. For example, a minimal length sequence corresponding to the minimal length tour listed above for the graph 900 of FIG. 10 is as follows:

In this minimal length sequence, the first transition of this minimal length sequence is from state 1 to state 2, as represented by $v_1$ and $v_2$, respectively. This transition occurs upon receipt of the input $I_1$ having values 9 and 1 for parameters a and b, respectively. The corresponding expected output generated by this transition is $O_1$ with a parameter p having a value of 9. Further, the last state entered by the minimal length sequence is 1 as represented by $v_1$.

According to the test sequence generation routine 200, a UIO sequence is then generated for the test state of the minimal length sequence in step 290 in order to verify the final state of the test sequence. Using the technique disclosed, in U.S. Pat. No. 4,692,921, the UIO sequence for the state $v_1$ in the example is $I_1(a=5,b=0)/O_1(p=5)$. This UIO sequence is then concatenated to the end of the minimal length sequence in step 295 of the routine 200 to generate the desired conformance test data sequence which is illustrated as a table 1000 in FIG. 11.

Referring to the table 1000 of FIG. 11, columns 1010 and 1020 contain the series of initial and final states for each state transition that is to occur during the execution of the conformance test sequence. Columns 1030 and 1040 contain the corresponding input and output parameters, and their respective values for the state transitions listed in the columns 1010 and 1020. Further, rows 1050 through 1055 correspond to the minimal length test sequence listed above, and row 1070 corresponds to UIO sequence for the ending state $v_2$ of the minimal length test sequence.

During a conformance test by the testing system 100 of FIG. 2, the device 110 under test is initialized to state $v_1$ and the particular sequence of inputs of column 1030 are applied to the device 110. In response, the testing computer 120 receives corresponding generated outputs and compares them with the expected outputs listed in column 1040. For example, when the conformance test data sequence in the table 1000 is applied to the device 110 which is initialized to state $v_1$, the first input to be applied is $I_1(a=9,b=1)$ as shown in row 1050 of the column 1030. Assuming the device conforms to the EFSM protocol standard of FIG. 1, then the device 110 would generate the output $O_1(p=9)$ and enter the state $v_2$.

After testing the first state transition, the input $I_2(c=0)$ is applied to the device 110 by the testing computer 120, as shown in row 1060. The corresponding generated output is then compared against the output in the row 1060 and the column 1040 which is $O_3(r=0)$. This is repeated for each input and output listed in the sequence table 1000 until the output of the last row 1070 is verified. If the sequence of generated outputs corresponds to those listed in the column 1040, the testing system 100 of FIG. 2 alerts the tester that the device 110 conforms to the protocol. Otherwise, the tester is alerted that a disparity exists between the device and the protocol specification.

Performance of a conformance test data sequence is measured by the two criteria, fault coverage and efficiency. Fault coverage is an evaluation of the ability of the conformance test sequence to identify discrepancies in the implementation of a protocol in a device under test. Fault coverage is dependent on the values selected for the input and output parameters in the test data set. Efficiency is a measure of the length of the conformance test sequence. A shorter sequence is considered more efficient than a longer sequence. Various techniques for selecting the test data set to provide adequate fault coverage are known in the art. Several selection techniques are described in P. G. Frankl and E. J. Weyuker, *Provable Improvements on Branch Testing*, IEEE Transactions on Software Engineering, (October, 1993).

The two performance criteria of fault coverage and efficiency often conflict. An improvement of the fault coverage typically produces a corresponding increase in the length of the conformance test data sequence. As a result, reductions in efficiency which accompany improvements in fault coverage of a conformance test data sequence may diminish any overall increase in the measured performance. Therefore, a goal in generating conformance test data sequences is to increase the fault coverage with minimal increases in the sequence length.

An advantage of the present invention is that it is capable of generating a conformance test data sequence having minimal length for a given test data set and its corresponding fault coverage. Thus, a conformance test data sequence generated according to the present invention maximizes the possible efficiency for the particular selected test data set and corresponding measure of fault coverage.

Although one embodiment of the method for generating a conformance test sequence has been described in detail above with respect to the EFSM 5 in FIG. 1, it would be readily understood by those having ordinary skill in the art that many modifications are possible in the described embodiment without departing from the teachings of the present invention. All such, modifications are intended to be encompassed by the claimed invention. For instance, other techniques for generating the UIO sequence than that described above may be utilized with the present invention. Further, although the example EFSM concerned a communications protocol, the present invention may be used for generating conformance test data sequences for any entity that can be characterized by a simplified EFSM.

We claim:

1. A method for generating a conformance test data, sequence for use in verifying that a device conforms to a specific protocol entity, the method comprising the steps of:

generating a simplified extended finite state machine based on a formal description of the protocol entity;

deriving an expanded directed graph of the simplified extended finite state machine, wherein each state is represented by a state vertex connected to a dummy vertex by a directed edge, and wherein the state and dummy vertices representing each state are connected to each other by directed edges in a manner corresponding to the operation of the simplified extended finite state machine;

assigning traversal numbers to the directed edges of the expanded directed graph based on a test data set;

evaluating the expanded directed graph and, if not symmetric, balancing the traversal numbers of the expanded directed graph to produce a symmetric expanded directed graph;

obtaining a minimal length tour of the symmetric expanded directed graph;

removing the dummy transition vertices from the minimal length tour to produce a minimal length test sequence;

generating a unique input-output sequence of a last state of the minimal length test sequence; and generating the conformance test data sequence by concatenating the unique input-output sequence to the minimal length test sequence to verify the ending state of the device.

2. The method of claim 1, wherein the step of assigning traversal numbers to the expanded directed graph further comprises the steps of:

assigning a traversal number to each directed edge equal in value to the minimum number of times the directed edge needs to be traversed in order to satisfy values of inputs and outputs contained in the test data set for that directed edge; and assigning a traversal number of 1 where the number of times particular inputs and outputs for a corresponding directed edge is not specified in the test data set.

3. The method of claim 1, wherein the balancing of the traversal numbers of the expanded directed graph comprises the steps of:

local balancing the traversal numbers of the directed edges extending into the dummy vertices if such traversal numbers are less than the summation of the traversal numbers of the directed edges extending away from the dummy vertices such that the traversal numbers of the directed edge extending into the dummy vertices are equal in value to the summation of the corresponding traversal numbers of the directed edges extending away from the dummy vertices; and evaluating the local balanced expanded directed graph and, if not symmetric, global balancing all vertices of the expanded graph to form a symmetric expanded directed graph.

4. The method of claim 3, wherein the global balancing of the expanded directed graph is performed utilizing a minimum-cost maximum-flow technique.

5. The method of claim 1, wherein the minimal length tour is generated by performing an Euler tour of the symmetric expanded directed graph.

6. A method for generating a conformance test data sequence for use in verifying that a device conforms to a specific protocol entity, the method comprising the steps of:

generating a simplified extended finite state machine based on the a formal description of the protocol;

deriving an expanded directed graph of the simplified extended finite state machine, wherein each state is represented by a state vertex connected to a dummy vertex by a directed edge, and wherein the state and dummy vertices representing each state are connected to each other by directed edges in a manner corresponding to the operation of the extended finite state machine;

assigning traversal numbers to the directed edges of the expanded directed graph based on a test data set;

generating a minimal length tour by performing a Rural Chinese Postman Tour of the expanded directed graph based on the traversal numbers;

removing the dummy transition vertices from the minimal length tour to produce a minimal length test sequence;

generating a unique input-output sequence of a last state of the minimal length test sequence; and generating the conformance test data sequence by concatenating the unique input-output sequence to the minimal length test sequence to verify the ending state of the device.

7. A method for generating an expanded directed graph for a simplified extended finite state machine for use in generating a conformance test data sequence, the method comprising the steps of:

representing each state of the simplified extended finite state machine by a state vertex connected to a dummy vertex with a directed edge; and connecting the vertices representing each state to each other by directed edges in a manner corresponding to the operation of the simplified extended finite state machine.

8. A method for verifying that a device conforms to a specific protocol entity comprising the steps of:

providing input parameter values to the device based on a conformance test data sequence; and monitoring the output parameter values produced by the device, to verify that they conform to expected output parameter values based on the conformance test data sequence, wherein the conformance test data sequence is produced by the steps of:

generating a simplified extended finite state machine based on a formal description of the protocol entity;

deriving an expanded directed graph of the simplified extended finite state machine, wherein each state is represented by a state vertex connected to a dummy vertex by a directed edge, and wherein the state and dummy vertices representing each state are connected to each other by directed edges in a manner corresponding to the operation of the simplified extended finite state machine;

assigning traversal numbers to the directed edges of the expanded directed graph based on a test data set;

evaluating the expanded directed graph and, if not symmetric, balancing the traversal numbers of the expanded directed graph to produce a symmetric expanded directed graph;

obtaining a minimal length tour of the symmetric expanded directed graph;

removing the dummy transition vertices from the minimal length tour to produce a minimal length test sequence;

generating a unique input-output sequence of a last state of the minimal length test sequence; and generating the conformance test data sequence by concatenating the unique input-output sequence to the minimal length test sequence to verify the ending state of the device.

9. An apparatus for verifying that a device conforms to a specific protocol which can be characterized by an extended finite state machine, the apparatus comprising:

a processor;

a memory connected to the processor; and a test communications line connected to the processor, the test communications line having a device interface for connection to a device under test to provide communications between the processor and the device, the processor generating a conformance test data sequence to verify that the device conforms to a specific protocol, wherein the processor generates the conformance test data sequence by generating a simplified extended finite state machine based on a formal description of the protocol, deriving an expanded directed graph of the simplified extended finite state machine, assigning traversal numbers to the directed edges of the expanded directed graph based on a test data set, evaluating the expanded directed graph and, if not symmetric, balancing the traversal numbers of the expanded directed graph to produce a symmetric expanded directed graph, computing a minimal length tour of the symmetric expanded directed graph, removing the dummy transition vertices from the minimal length tour to produce a minimal length test sequence, generating a unique input-output sequence of a last state of the minimal length test sequence, and concatenating the unique input-output sequence to the minimal length test sequence.

* * * * *